United States Patent [19]
Ruff

[11] Patent Number: 6,149,118
[45] Date of Patent: Nov. 21, 2000

[54] ROTATIONAL MOUNTING ARRANGEMENTS

[75] Inventor: Stephen Anthony George Ruff, Buckinghamshire, United Kingdom

[73] Assignee: Martin-Baker Aircraft Company LTD, Middlesex, United Kingdom

[21] Appl. No.: 09/342,374

[22] Filed: Jun. 29, 1999

[30] Foreign Application Priority Data

Jun. 29, 1998 [GB] United Kingdom ................... 9814063

[51] Int. Cl.$^7$ .................................................. F16M 13/00
[52] U.S. Cl. .......................................................... 248/418
[58] Field of Search .................................... 248/415, 416, 248/417, 418, 423, 425; 297/344.21, 344.24

[56] References Cited

U.S. PATENT DOCUMENTS

| | | | |
|---|---|---|---|
| 4,697,778 | 10/1987 | Harashima | 248/349 |
| 5,584,460 | 12/1996 | Ropp | 248/423 |
| 5,720,462 | 2/1998 | Brodersen | 248/425 |
| 5,782,451 | 7/1998 | Carnahan et al. | 248/425 |
| 5,853,221 | 12/1998 | Thoman et al. | 248/425 X |

*Primary Examiner*—Ramon O. Ramirez
*Attorney, Agent, or Firm*—Fulwider Patton Lee & Utecht LLP

[57] ABSTRACT

The rotational mounting arrangements for mounting an item on a mounting surface include a stator element and rotor element cooperating together to mount the item for rotational movement relative to the mounting surface, and a locking mechanism for releasably locking the rotor element in one or more predetermined positions relative to the stator element. The locking mechanism may include one or more apertures formed in one of the stator and rotor elements, and one or more apertures or recesses in the other of the stator and rotor elements for receiving a locking component. In another form, the locking mechanism may include one or more apertures formed in one of the stator and rotor elements, and a locking component carried on the other of the stator and rotor elements.

17 Claims, 7 Drawing Sheets

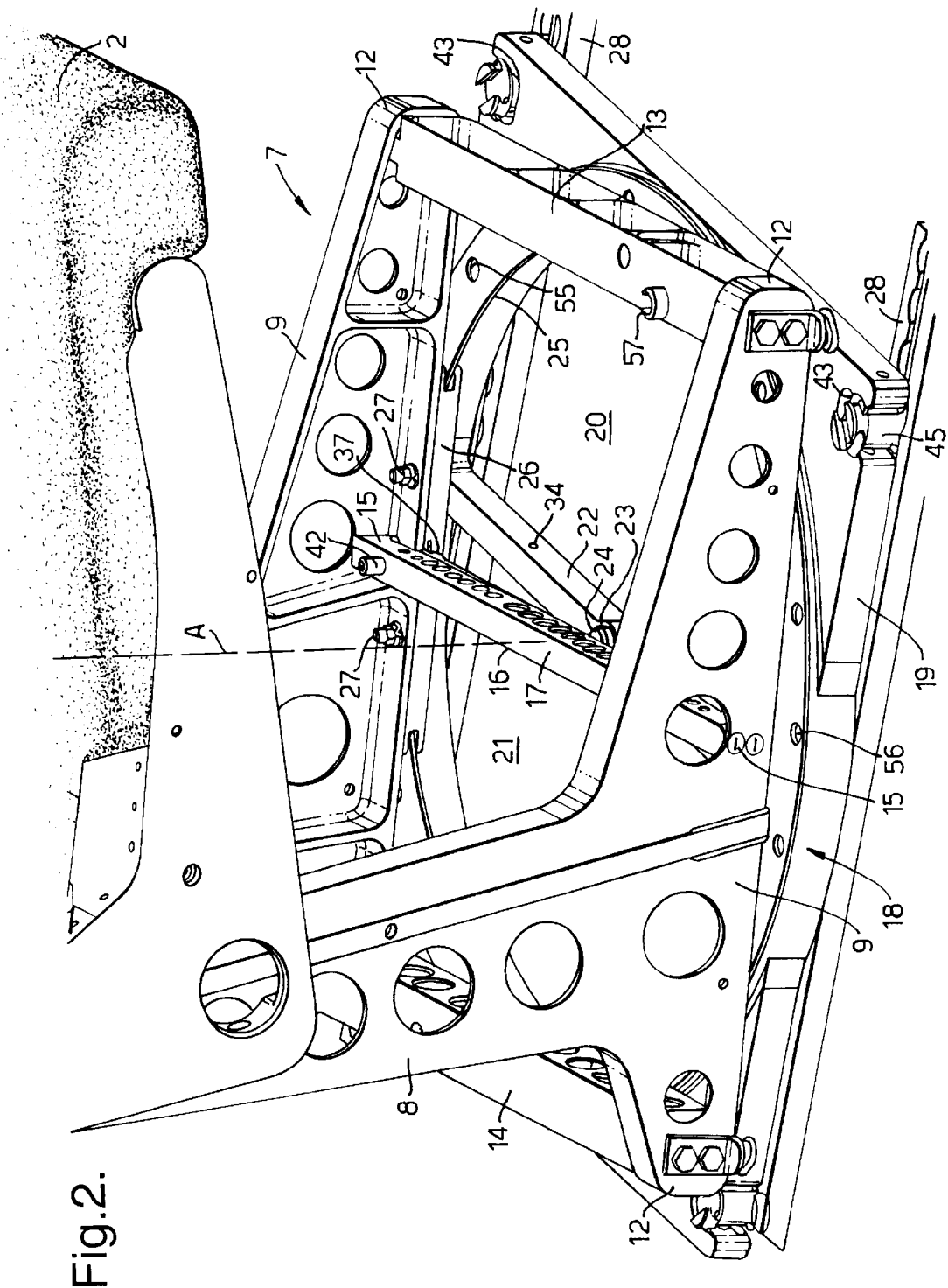

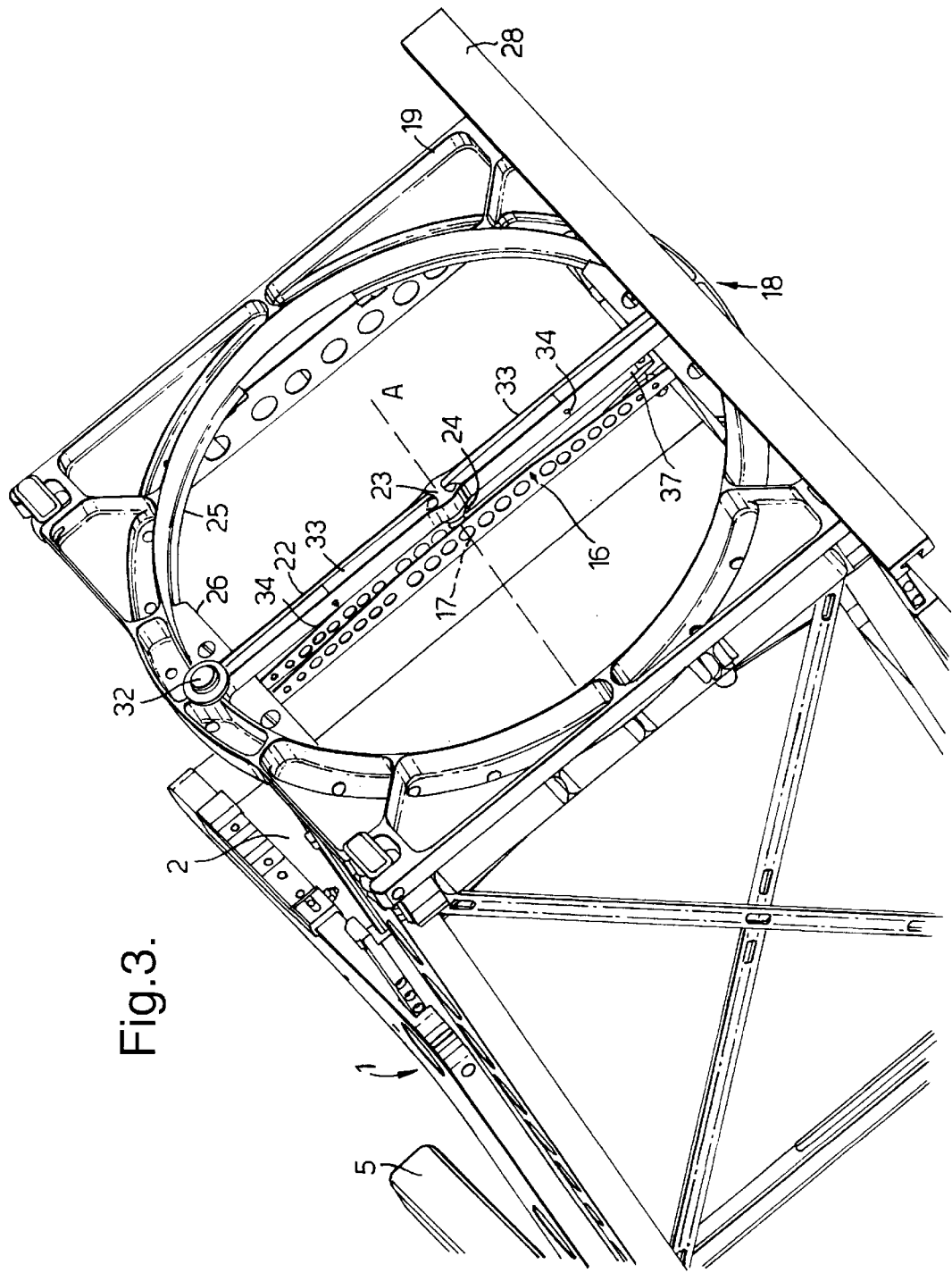

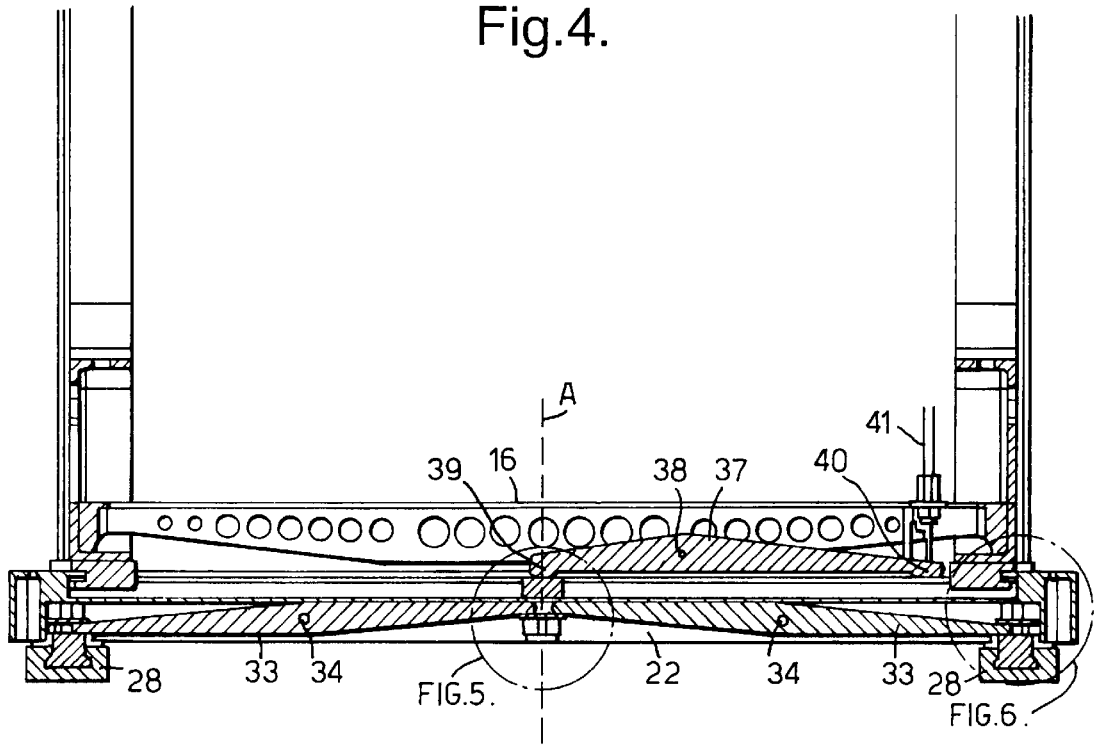
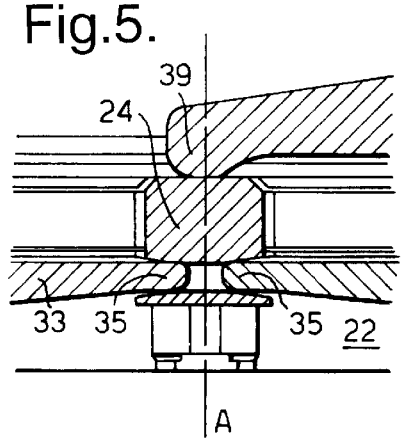
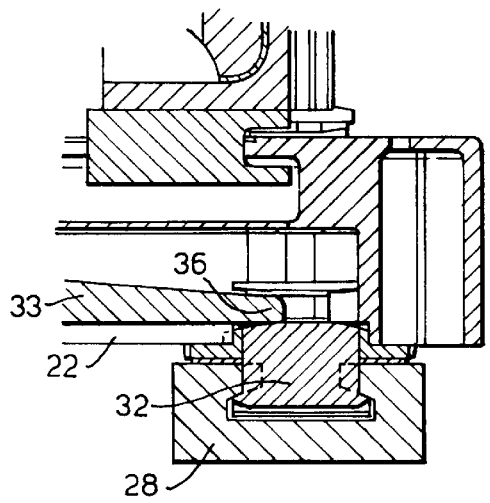

ROTATIONAL MOUNTING ARRANGEMENTS

This invention relates to a rotational mounting arrangement and more palticularly, though not exclusively, relates to an arrangement suitable for mounting a seat on a floor surface within an aircraft for rotational movement relative thereto.

In some types of aircraft, for example emergency search and rescue or medical evacuation helicopters, it is often desirable to provide one or more rotating seats so as to allow the occupant, for example a medical attendant, to rotate in flight and attend to patients and perform other search and rescue tasks.

As with all flight equipment carried by aircraft, the mass of such rotating seats and their attachments should be kept to a minimum, thereby reducing the overall weight of the aircraft. Aircraft seats must also be capable of withstanding the high loads impaited to them in the event of a crash to maximise the safety of the occupants. However, the loads impailed on a seat during normal in-flight use are generally much less extreme than crash case loads, and so the high mass structures used to sustain crash case loads are generally not required in normal use.

From engineering considerations, in order to minimise the mass of aircraft seat mounting arrangements for a predetermined strength to resist crash case loads, it is desirable to provide a structure having direct load paths between the seat and the floor upon which the seat is mounted so as to minimise the extent to which pails of the structure are subjected to bending loads.

It is an object of the present invention to provide an improved arrangement for mounting a seat on a floor surface for rotational movement relative thereto.

According to one aspect of the present invention there is provided an arrangement for mounting an item on a mounting surface for rotational movement relative thereto, the arrangement comprising: a stator element fixedly associable with the mounting surface, the stator element having a plurality of stator contact surfaces; a rotor element securable to the item, the rotor element being mounted upon the stator element for rotation relative thereto about an axis of rotation substantially perpendicular to the plane of the mounting surface and having a plurality of rotor contact surfaces; and means to lock releasably the rotor element in at least one predetermined position relative to the stator element, the arrangement being such that each rotor contact surface engages a respective stator contact surface in the or each said predetermined position only.

Conveniently, all of the stator contact surfaces and all of the rotor contact surfaces lie in a plane substantially perpendicular to the axis of rotation.

Advantageously, each stator contact surface and each rotor contact surface lies on a circle centred on the axis of rotation.

Preferably, either each stator contact surface is located within a contact channel and each rotor contact surface is located on a contact component receivable within the contact channel; or each rotor contact surface is located within a contact channel and each stator contact surface is located on a contact component receivable with the contact channel.

Conveniently, the major axis of each contact channel lies on a tangent to a circle centred on the axis of rotation.

Advantageously, one of said elements is provided with a circular flange at least partially received within a guide arrangement on the other element for movement therein.

Preferably, the guide arrangement comprises at least one part-circular guide channel.

Conveniently, the stator element carries the circular flange.

Advantageously, said means to lock releasably comprises at least one aperture formed in pail of a first one of said elements, at least one aperture or recess formed in the second of said elements and a locking component adapted to pass through the or each aperture on the first element and through or into the or each aperture or recess on the second element.

Preferably, said means to lock releasably comprises at least one aperture or recess formed in pail of one of said elements and a locking component carried on the other element and adapted to engage the or each aperture or recess.

Conveniently, the stator element is formed integrally with the mounting surface.

Advantageously, the stator element is removably mountable on tracks carried on the mounting surface and is securable relative to the mounting surface at predetermined positions along said tracks.

Preferably, the arrangement is provided in combination with a seat.

In order that the present invention may be more readily understood and so that further features thereof may be appreciated, an embodiment thereof will now be described, by way of example, with reference to the accompanying drawings, in which:

FIG. 2 is an enlarged perspective view of the seat mounting arrangement of FIG. 1, illustrated in an alternate position;

FIG. 3 is a perspective view from below of the seat mounting arrangement of the present invention, part of the arrangement being illustrated in engagement with a length of floor mounting track;

FIG. 4 is a sectional view through part of the seat mounting arrangement, taken along line I—I of FIG. 1;

FIG. 5 is more detailed view of part of the arrangement illustrated in FIG. 4;

FIG. 6 is a more detailed view of another pail of the arrangement illustrated in FIG. 4;

Figure 1:
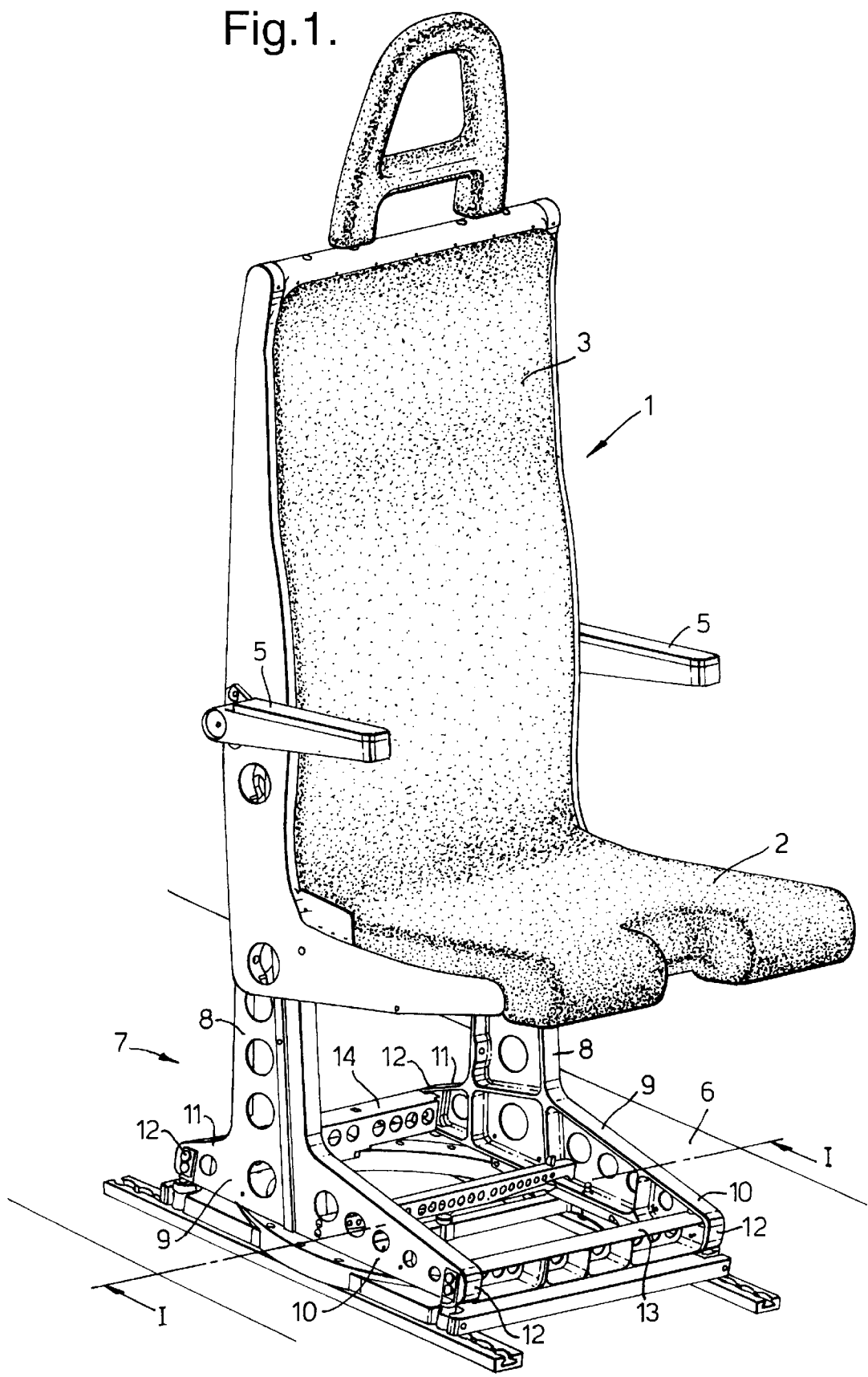
FIG. 1 is a perspective view of an aircraft seat mounted upon a floor surface by way of an arrangement in accordance with the present invention.
Figure 7:
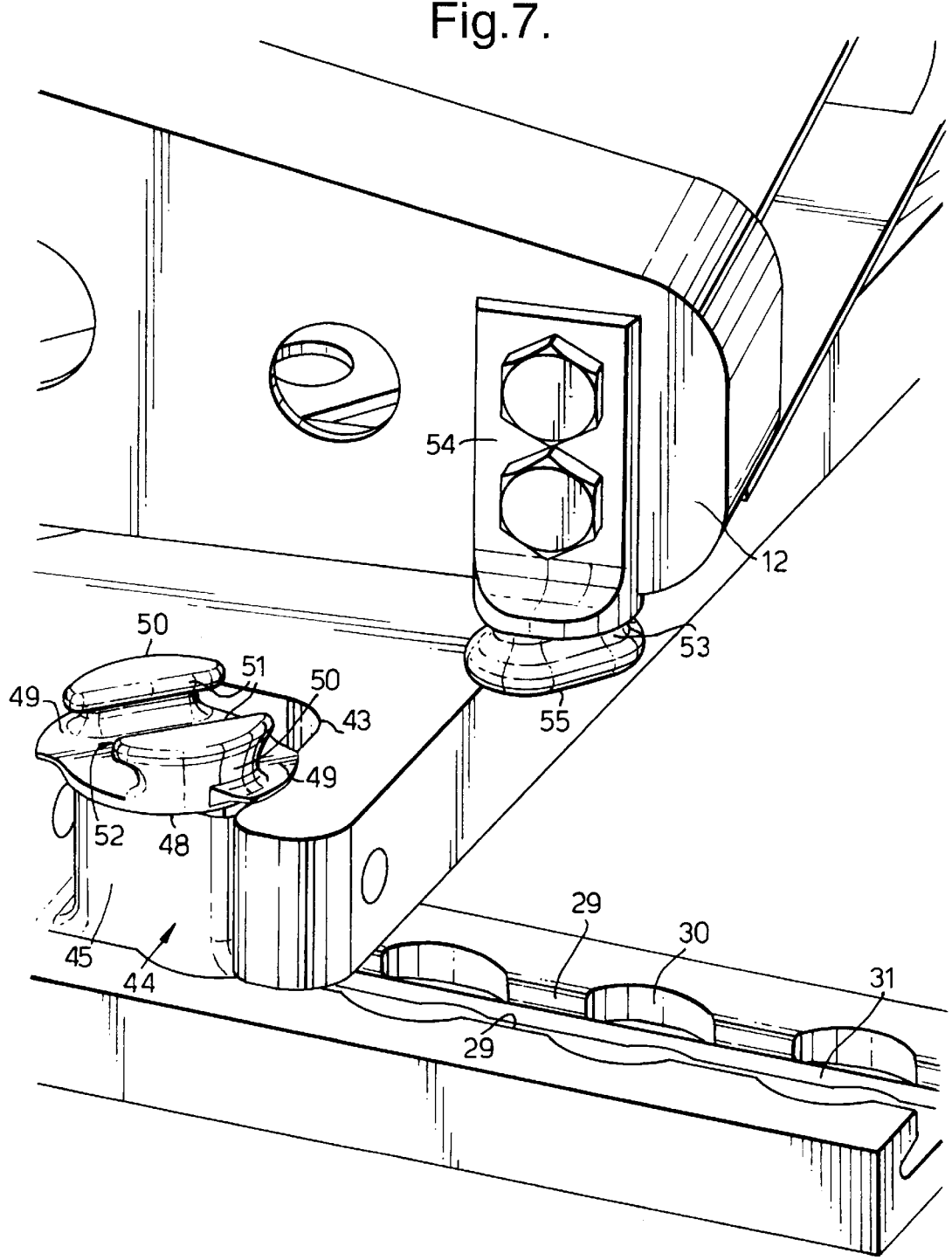
FIG. 7 is a still further, enlarged perspective view of part of the seat mounting arrangement of FIG. 2.
Figure 8:
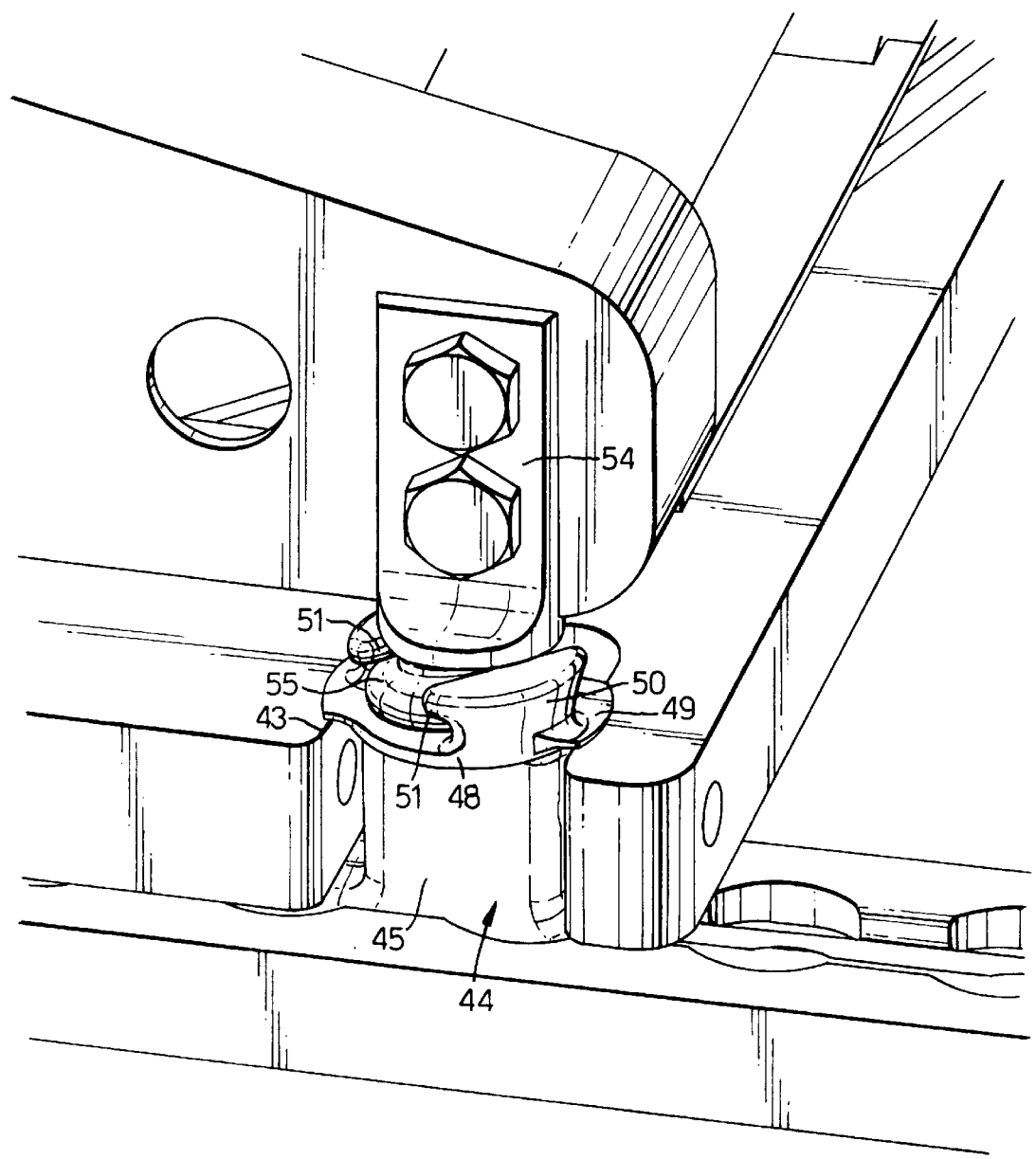
FIG. 8 is a perspective view corresponding to FIG. 3, illustrating the seat mounting arrangement in the position shown in FIG. 1.
Figure 9:
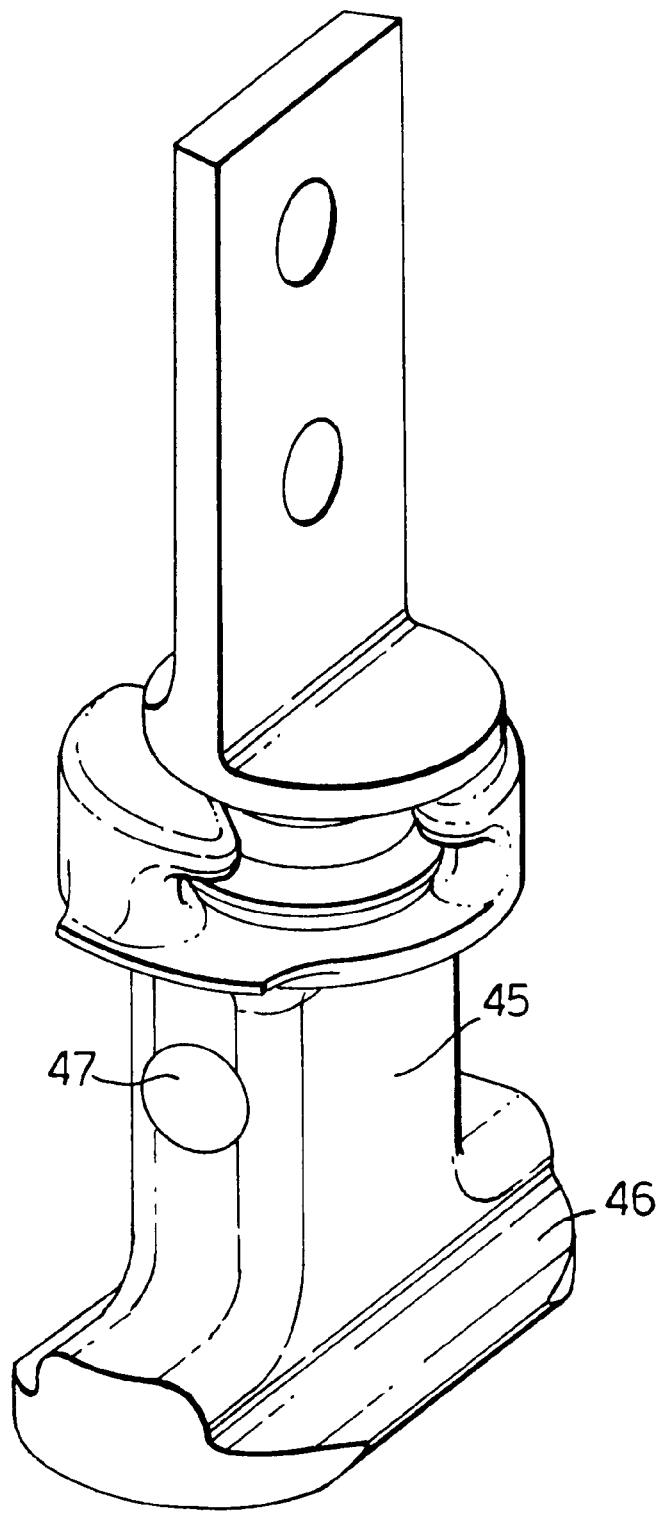
FIG. 9 is a perspective view of two parts of the seat mounting arrangement of the present invention illustrated in combination with one another.

Referring initially to FIG. 1, there is illustrated a generally conventional aircraft seat 1, having a squab 2, a backrest 3 and a pair of arm rests 5, the seat 1 being mounted on a floor surface 6 by way of a mounting arrangement, indicated generally at 7, in accordance with the present invention.

The mounting arrangement 7 comprises a pair of substantially vertically-extending leg components 8 which may be secured to the seat 1, in the base region 9 of the seat 1, by any convenient means, for example by way of a simple nut and bolt arrangement or by welding. The two leg components 8 are spaced apart from one another by a distance approximately equal to the transverse width of the squab 2 of seat 1.

The lower end of each leg component 8 is provided with a forwardly and rearwardly-extending foot portion 9, the forward extension 10 of each foot portion 9 being greater than the rearward extension 11 of each foot portion 9. The overall length of each foot portion 9 is generally equal to or slightly greater than the depth of the squab 2 of the seat 1 and preferably is substantially equal to the separation between the respective leg components 8, such that the free ends of the two foot portions 9 lie at the four corners of a square. The forwardmost end 12 of each foot portion 9 is connected to the forwardmost end 12 of the other foot portion 9 by a forward transverse member 13, whilst the two rearward ends 12 are similarly commented to one another by a rearward transverse member 14.

Turning now to FIG. 2, which illustrates the seat mounting arrangement 7 of the present invention in more detail, it will be seen that the mid-point 15 of each foot portion 9 is joined to the mid-point 15 of the other foot portion 9 by a central transverse member 16. As will be appreciated, the mid-point 17 of the central transverse member 16 coincides with the centre of the square formed by the four ends 12.

The aforementioned leg components 8, foot portions 9, forward transverse member 13, rearward transverse member 14 and central transverse member 16 together form a rotor element of the seat mounting of the present invention which is mountable upon a stator element indicated generally at 18 for rotational movement relative thereto about an axis A (illustrated in phantom) extending substantially vertically through the mid-point 17 of the transverse central member 16 and perpendicular to the plane of the floor surface 6.

The stator element 18 comprises a table component 19 of generally square form having two substantially semi-circular portions 20, 21 removed therefrom, thereby leaving a central transverse stator member 22 extending substantially transversely across the table 19. The mid-point 23 of the central transverse stator member 22 lies on the axis A (as does the mid-point 17 of the transverse central member 16), and carries a central plunger 24 adapted for vertical movement relative thereto. The function of the central plunger 24 will be described hereinafter.

Around the periphery of the circle described by the two semi-circular portions 20, 21, there is provided an inwardly-directed circular flange 25 which forms pail of a guide arrangement adapted to allow rotation between the rotor and stator elements.

To the under surface of each foot portion 9, there is secured a part-circular guide channel 26, secured for example by way of conventional bolts 27 as illustrated in FIG. 2 and forming another pail of said guide arrangement. The part-circular guide channels 26 receive slideable the circular flange 25 and co-operate therewith to provide additional support and stability to the seat mounting arrangement 7 as the rotor element rotates with respect to the stator element during rotation of the seat.

The stator element 18 is preferably adapted to be secured between parallel tracks 28 installed in the floor of the aircraft. As will be best appreciated from FIG. 4, each track 28 takes the form of an open-topped channel having a pair of longitudinally-extending and inwardly-directed lips 29, each lip 29 being provided with equi-spaced arcuate cut-outs 30 at predetermined positions therealong to provide a number of generally circular locating apertures 31.

Turning now to FIG. 2 which illustrates the stator element 18 as viewed from below, the stator element 18 is provided with a pair of diametrically opposed downwardly depending locating plungers 32, adapted for vertical movement relative to the stator element 18 (only one plunger being shown). Each locating plunger 32 is located in the region of a respective end of the central transverse stator member 22, such that the two locating plungers 32 are spaced apart from one another by a distance equal to that separating the two parallel tracks 28.

Each locating plunger 32 is of generally cylindrical form and is sized to engage the circular locating apertures 31 of the tracks 28.

In order to secure the stator element 18 to the parallel tracks 28, the stator element is positioned such that each locating plunger 32 is located vertically above a locating aperture 31 in a respective track 28. Each locating plunger 32 may then be depressed relative to the stator element 18 such that it engages the respective aperture as illustrated in FIG. 6, thereby preventing horizontal movement of the mounting arrangement 7 relative to the tracks 28.

Each locating plunger is biased (for example, spring biased) towards its depressed position so that it is urged into engagement with the track 28. Means, which will now be described, are provided to lift each locating plunger out of engagement with the track, against the bias.

As can be seen from FIG. 3, both the central transverse stator member 22 and the central transverse rotor member 16 are both in the form of a channel having a generally U-shaped cross-section opening downwardly. Within the thus-formed central transverse stator member are located pair of substantially identical link levers 33, one situated each side of the midpoint 23 of the central transverse stator member 22. Each link lever 33 is pivotally mounted with respect to the central transverse stator member 22 about a respective pivot point 34 and serves to link the central plunger 24 with a respective locating plunger 32.

As can be seen from FIGS. 4, 5 and 6, the innermost end 35 of each link lever 33 cooperates with the central plunger 24, whilst the outermost end 36 of each link lever 33 cooperates with a respective locating plunger 32.

The central plunger 24 is biased (for example spring biased) upwardly relative to the central transverse stator member 22 into a position illustrated in FIGS. 4 and 5. It will of course be remembered that each locating plunger 32 is biased downwardly. As the central plunger is moved downwardly against this bias, the innermost end 35 of each link lever 33 is also moved downwardly due to its cooperation with the plunger 24. Each link lever 33 thus pivots about its pivot point 34 such that its outermost end 36 moves upwardly, thereby urging the respective locating the respective locating plunger upwardly (due to its cooperation with the outermost end 36) against its bias and out of engagement with the track 28.

A primary lever 37 is located within the central transverse rotor member 16, to one side of the midpoint 17 thereof The primary lever 33 is pivotally mounted within the central transverse rotor member 16 about a pivot point 38. The innermost end 39 of the primary lever 37 is located on the axis of rotation A, at a point vertically above the central plunger 24 and is adapted to bear upon the uppermost surface of the central plunger 24 upon actuation of the primary lever 37. The outermost end 40 of the primary lever 37 is secured to a cable 41 which passes upwardly through an aperture 42 (best seen in FIG. 2) in the central transverse rotor member 16 and away to a more conveniently located actuating mechanism (not shown).

Thus, by withdrawing the cable 41 slightly from the central transverse rotor member 16, the outermost end 39 of the primary lever 37 is raised such that the lever pivots about its pivot point 38, thereby lowering its innermost end 39 which in turn bears upon the central plunger 24 depressing it and actuating the afore-mentioned link levers 33 to withdraw the locating plungers 32 from their respective tracks.

Since the innermost end 38 of the primary lever 37 is located on the axis of rotation A, it is always able to cooperate with the central plunger 24 on the stator element, regardless of the relative rotational positions of the stator element and the rotor element.

The table 19 of the stator element 18 is provided with a cut-out 43 in each corner region. Each cut-out 43 is adapted to receive therein a securing component 44 which in turn is adapted to engage the track 28.

As can be seen more clearly in FIG. 4, each securing component 44 comprises a main shank portion 45 which has a substantially rectangular transverse cross-section having chamfered corners.

Turning briefly to FIG. 5, the lower end of the shank portion 45 is provided with an inverted T-shaped foot portion 46 adapted to be received within a track 28 and retained below the pair of inwardly directed lips 29. In this way, each securing component when retained within a track 28 is allowed to slide substantially freely along the track but is not able to be removed vertically therefrom.

The shank 45 is provided with a through-bore 47 therethrough which is generally parallel to the major axis of the T-shaped foot 46.

The upper end of each shank 45 is provided with a slightly enlargened head portion 48 of generally circular form, but having a pair of diametrically opposite outwardly-extending flanges 49. These flanges 49 are opposed across a diameter of the head portion 48 being substantially parallel to the axis of the through-bore 47 and the major axis of the T-shaped foot portion 46. Thus, when the securing component 44 is received within the track 28, as described above, the head portion 48 is orientated such that the flanges 49 each lie substantially over and engage a portion of the table 19 adjacent the cut-out 43. As can be seen from FIG. 4 particularly, when in this position, the throughbore 47 is aligned with a pair of bores formed in the table 19 on each side of the cut-out 43. This enables a retaining rod (not shown) to be inserted through each of these aligned bores to further prevent relative movement between securing component 44 and the table 19. When in this position, the securing component 44 is locked with respect to the table 19 and therefore the four securing elements 44 serve, together with the pair of locating plungers 32, to secure the stator element 18 to the floor surface 6. The locating plungers 32 prevent longitudinal horizontal movement of the stator element relative to the floor surface 6 in a direction parallel to the tracks 28, whilst the four securing components 44 prevent vertical movement and transverse horizontal movement of the stator element relative to the floor surface 6.

Due to the fact that the T-shaped foot portion 46 of each securing component 44 is freely slideable within the respective track 28, the position of the seat mounting arrangement 7 relative to the floor surface 6 can quite simply be adjusted by lifting the plungers 42 out of engagement with the respective locating apertures 31 and sliding the entire assembly along the tracks until each locating plunger 32 is located above another respective locating aperture 31, whereafter the plungers can be released to engage the tracks 28 in the new position.

The enlargened head portion 48 of each securing component 44 is provided with a pair of diametrically opposed upstanding portions 50 each of which carries an upper, inwardly-directed lip 51 which together form a contact channel 52. As will be appreciated from the drawings, the securing components 44 are of two mirror-image configurations and are so disposed such that when each securing element 44 is in its locked position relative to the track 28 and the table 19, the major axis of each contact channel 52 lies on a respective tangent to the same circle centred on the axis of rotation A.

Each corner portion 12 of the foot portions 9 is provided with a downwardly-extending contact component 53, which actually depends from a substantially vertical flat plate 54 which is secured to the side of the respective foot portion 9 by way of, for example, bolts (as illustrated in the drawings) or by a more permanent welding arrangement.

Each contact component 53 is of substantially oval configuration having a downwardly and outwardly directed peripheral flange 55. The peripheral flange 55 is configured and dimensioned to engage in the contact channel 52, below the two opposed longitudinal lips 51 thereof. It should also be noted that the major axis of each contact component 53 lies on a tangent to a circle centred on the axis of rotation A, the circle having a diameter equal to that to which the major axes of the contact channels 52 form tangents. In this way, it will be appreciated that during a complete revolution of the seat and its associated rotor element, about the axis of rotation A, each contact component 53 will engage and pass through each of the four contact channels 52, in turn. In other words, with the arrangement illustrated, having four contact channels 52 at the corners of a square and four corresponding contact components 53, also at the corners of a square, there will be four predetermined positions about a revolution of the seat 1 at which each contact component 53 engages a respective contact channel 52. The engagement between a contact component 53 and a respective contact channel 55 is illustrated in more detail in FIG. 4 and in FIG. 5.

In the preferred embodiment illustrated herein, the internal surface of the contact channel 55 forms a stator contact surface and the outer surface of the contact component 53 forms a rotor contact surface.

It will be appreciated that at least part of the or each rotor contact surface and at least part of the or each stator contact surface lies in the same plane, substantially perpendicular to the axis of rotation A.

Each of the above-mentioned predetermined positions, in which each contact component 53 engages a respective contact channel 52, is a "crash position" in which four direct load paths are provided between the floor of the aircraft 6 and the rotor element of the seat mounting arrangement which is of course secured to the seat. Each of these load paths is substantially vertical (particularly favourable for helicopter seats in which the major force components resulting from a crash are substantially vertical), passing through the securing components 45, the contact channels 52 and the contact components 53. As will be appreciated, with the provision of such direct load paths only in four predetermined positions throughout a single revolution of the seat (in the case illustrated, a forward-facing position, an aft-facing position and two opposite side-facing positions), the entire seat mounting arrangement can be made significantly lighter than would be the case if direct load paths were to be provided for every intermediate location or position of the seat relative to the floor.

It will be appreciated that in the event of a crash there will almost inevitably be non-vertical force components acting tangentially with respect to the axis of rotation A for example, which will tend to cause rotation of the rotor element relative to the stator element out of one of said predetermined crash positions. This is to be avoided since rotation out of a predetermined crash position would break the aforesaid direct load paths and result in bending of the seat mounting arrangement which the arrangement is not designed to withstand. Therefore, there is provided additional locking means adapted to lock releasably the rotor element in each predetermined crash position relative to the stator element.

In the embodiment illustrated in the drawings, this locking means comprises a number of apertures or recesses 56 formed around the outside of the inwardly-directed circular flange 25 on the stator element 18. One or more of these apertures or recesses 56 align with respective apertures formed through part of the rotor element when in each predetermined crash position, for example aperture 57 formed through the forward transverse member 13. A locking component is provided (not shown) which is adapted to pass through the aperture 57 in the rotor element and through or into the aligned aperture or recess 56 in the stator element to prevent relative rotation therebetween.

Of course other forms of locking means are possible. For example the rotor element could be provided with one or more actable locking components operable between a retracted position and a locking position in which the or each locking component engages an aligned aperture or recess 56 on the stator element.

Of course, it will be appreciated that whilst the present invention has been described with reference to a particular embodiment, various modifications or alterations could be effected without departing from the scope of the invention. For example, rather than the stator element being mountable on tracks 28 provided on the floor surface 6, the stator element could in fact be formed integrally with the floor surface 6.

It will also be appreciated that whilst the present invention has been described with particular reference to use in mounting a seat on a floor surface for rotational movement relative thereto, the invention is equally suitable for use in mounting other items on any convenient mounting surface for rotational movement relative thereto.

What is claimed is:

1. An arrangement for mounting an item on a mounting surface for rotational movement relative thereto, the arrangement comprising: a stator element fixedly associable with the mounting surface, the stator element having a plurality of stator contact surfaces; a rotor element securable to the item, the rotor element being mounted upon the stator element for rotation relative thereto about an axis of rotation substantially perpendicular to the plane of the mounting surface and having a plurality of rotor contact surfaces; and means to lock releasably the rotor element in at least one predetermined position relative to the stator element, the arrangement being such that each rotor contact surface engages a respective stator contact surface in each said predetermined position only.

2. An arrangement according to claim 1, wherein all of the stator contact surfaces and all of the rotor contact surfaces lie in a plane substantially perpendicular to the axis of rotation.

3. An arrangement according to claim 1, wherein each said stator contact surface and each rotor contact surface lies on a circle centered on the axis of rotation.

4. An arrangement according to claim 1, wherein each stator contact surface is located within a contact channel and each rotor contact surface is located on a contact component receivable within the contact channel.

5. An arrangement according to claim 4, wherein the major axis of each contact channel lies on a tangent to a circle centered on the axis of rotation.

6. An arrangement according to claim 1, wherein each rotor contact surface is located within a contact channel and each stator contact surface is located on a contact component receivable with the contact channel.

7. An arrangement according to claim 5, wherein the major axis of each contact channel lies on a tangent to a circle centered on the axis of rotation.

8. An arrangement according to claim 1, wherein one of said stator and rotor elements is provided with a circular flange at least partially received within a guide arrangement on the other of said stator and rotor elements for movement therein.

9. An arrangement according to claim 8, wherein the guide arrangement comprises at least one part-circular guide channel.

10. An arrangement according to claim 8, wherein the stator element carries the circular flange.

11. An arrangement according to claim 1, wherein said means to lock releasably comprises at least one aperture formed in part of a first one of said stator and rotor elements, a least one aperture formed in the second of said stator and rotor elements and a locking component adapted to pass through each said aperture on the first element and into each said aperture on the second element.

12. An arrangement according to claim 1, wherein said means to lock releasably comprises at least one aperture formed of a first one of said stator and rotor elements, at least one recess formed in the second of said stator and rotor elements and a locking component adapted to pass through each said aperture on the first element and into each said recess on the second element.

13. An arrangement according to claim 1, wherein said means to lock releasably comprises at least one aperture formed in part of one of said stator and rotor elements and a locking component carried on the other of said stator and rotor elements and adapted to engage each said aperture.

14. An arrangement according to claim 1, wherein said means to lock releasably comprises at least one recess formed in part of one of said stator and rotor elements and a locking component carried on the other of said stator and rotor elements and adapted to engage each said recess.

15. An arrangement according to claim 1, wherein the stator element is formed integrally within the mounting surface.

16. An arrangement according to claim 1, wherein the stator element is removably mountable on tracks carried on the mounting surface and is securable relative to the mounting surface at predetermined positions along said tracks.

17. In a seat provided with a mounting arrangement for mounting the seat on a mounting surface for rotational movement relative thereto, the improvement comprising:

a stator element fixedly associable with the mounting surface, the stator element having a plurality of stator contact surfaces;

a rotor element securable to the seat, the rotor element being mounted upon the stator element for rotation relative thereto about an axis of rotation substantially perpendicular to the plane of the mounting surface and having a plurality of rotor contact surfaces; and means for releasably locking the rotor element in at least one predetermined position relative to the stator element, the arrangement being such that each rotor contact surface engages a respective stator contact surface in each said predetermined position only.

* * * * *